US006417937B1

(12) United States Patent
Batten et al.

(10) Patent No.: US 6,417,937 B1
(45) Date of Patent: Jul. 9, 2002

(54) INTEGRATED AUTOMATIC DOCUMENT FEEDER AND ACTIVE TRANSPARENCY ADAPTER

(75) Inventors: Patrick A Batten, Ft Collins; John G Thelen, Fort Collins, both of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/281,601
(22) Filed: Mar. 30, 1999
(51) Int. Cl.[7] ................................................ H04N 1/04
(52) U.S. Cl. ...................... 358/487; 358/475; 358/498
(58) Field of Search ............................... 358/496, 498, 358/487, 506, 475, 509; 271/3.14, 8.1; 250/208.1, 234–236; 399/559.27, 367

(56) References Cited

U.S. PATENT DOCUMENTS 5,038,227 A * 8/1991 Koshiyouji et al. ......... 358/471
5,781,311 A * 7/1998 Inoue et al. ................. 358/475
5,986,774 A * 11/1999 Han ............................ 358/487
6,185,011 B1 * 2/2001 William ...................... 358/474
6,316,766 B1 * 11/2001 Han ............................ 250/234

* cited by examiner

Primary Examiner—Cheukfan Lee

(57) ABSTRACT

A transparency adaptor is described that includes a flat panel illuminator integral with an automatic document feeder accessory for a flat bed scanner. The flat panel illuminator provides backlighting for scanning transparencies, such that light passes through the transparency only once and into the scanner optics within the scanner base. When the flat panel illuminator is lit during a scanning process, the light source within the scanner is not lit. The flat panel illuminator transparency adapter unit is controlled by the same control cable used by the automatic document feeder unit. The automatic document feeder and the flat panel illuminator transparency adapter may be simultaneously operated in order to scan more than one transparent document automatically.

13 Claims, 2 Drawing Sheets

INTEGRATED AUTOMATIC DOCUMENT FEEDER AND ACTIVE TRANSPARENCY ADAPTER

FIELD OF THE INVENTION

The present invention relates generally to the field of scanners and other devices used for transforming an optical image of a document into an electronic signal and more particularly to an integrated automatic document feeder and active transparency adapter for a scanner.

BACKGROUND OF THE INVENTION

Electronic document scanners, copiers, and facsimile machines transform an optical image of a document, photograph or transparency into an electronic signal suitable for storing, displaying, printing, processing by a computer or electronic transmission. A document scanner may be a separate device or a document scanner may be a part of a copier, part of a facsimile machine or part of a multipurpose device. For opaque documents, reflective scanners typically have a controlled light source which is reflected off of the surface of a document, through an optics system, and onto an array of photosensitive devices. The photosensitive devices convert received light intensity into an electronic signal. Transparency scanners pass light through a transparent image, for example a photographic positive slide, through an optics system, and then onto an array of photosensitive devices.

A transparent image may be scanned in a reflective scanner by placing a white surface behind the transparency. In such an arrangement, light passes through the transparency to the white background, reflects off the white background and passes through the transparency a second time before impinging onto the photosensitive devices. Therefore, light is filtered twice by the transparent image. In general, this double filtering creates an unacceptable distortion of gray scale, color, contrast and other image characteristics of interest.

Reflective flat bed document scanners may be adapted to scan transparent images by providing a separate light source to back-light the image so that the light passes through the transparency only once. In some systems, separate mirrors, lens and other optics may be required to properly project the image onto the photosensitive devices. Motors may also be required to move the external light source relative to the image. One such method is to use cathode fluorescent light bulbs in the scanner lid, so that there is back lighting, rather than reflective lighting for scanning transparencies. This method creates a very large scanner lid, since the fluorescent light bulbs are typically ½ to 1½ inches thick. This is also expensive in terms of additional components and requires a complex power supply to ensure that all of the lights are stable and the same brightness throughout the scanning process.

U.S. Pat. No. 5,463,217 (Sobol et al.), which is incorporated herein for all that it teaches and describes, describes a completely passive adapter for scanning transparent images in a reflective scanner without requiring a separate light source for back lighting. A light source in the reflective scanner provides light which passes outside the area of the transparent image. The adapter captures the light which passes outside the area of the transparent image and reflects the light through the transparent image. The reflected light re-enters the scanner along the optical path required by the scanner internal optics. The various embodiments described in Sobol et al. are suitable for a fixed scanner optical path. However, when a new scanner is developed, the angle of the adapted mirrors may need to change to accommodate a different optical path within the new scanner. The adapter of Sobol et al. requires an arrangement of mirrors, metal or a folded metallic coated cardboard adapter to be placed onto the platen glass. The adapter of Sobol et al. comprises at least one additional component to the scanner that may be misplaced or damaged. A similar transparency adapter is disclosed in U.S. Ser. No. 09/127,454 entitled Adjustable Adapter for Scanning Transparencies with a Reflective Document Scanner by Patrick Batten et al., filed Jul. 31, 1998, which is also incorporated herein for all that is taught and disclosed. Neither of these methods permits a full size image to be scanned when a transparency is being scanned.

Another method in which reflective scanners have been adapted to scan transparent images by providing a light source and moveable mirrors in the lid of the scanner. U.S. Pat. No. 5,710,425 (McConica et al.), which is incorporated herein for all that it teaches and describes, describes a scanner with a light source and moveable mirrors in the lid of the scanner and two different light paths depending on whether the document to be scanned is opaque or transparent. The first light path would reflect off of an opaque document and the second would pass through a transparent document. The mirrors within the lid reflect light back into the base of the scanner or onto the document being scanned. The device of McConica et al. require many components to be installed within the lid of the scanner and also require two separate sets of optical components to support two different light paths. There are also moving parts within the lid, which may get out of alignment due to opening and closing of the lid as would be required under normal scanner use.

All of these solutions only deal with flatbed scanners. There is not a good solution for allowing the scanning of a transparent document by an automatic document feeder (ADF) scanner device. In the past, a simple automatic document feeder permitted the scanning of multiple documents. When the ADF was attached to a flatbed scanner, the end user could scan flat originals as well, but to use a transparency adapter, the end user had to disable the ADF and changer over to the transparency adapter. The end user also had to turn off the scanner and reboot the computer to change from ADF capability to transparency adapter capability.

Moreover, most scanner accessories are sold separately and must be installed onto the scanner one at a time by the end user. This is troublesome because the electrical connector on the back of the scanner must be turned off to change an accessory. Sometimes it is also necessary to reboot the host computer so that the added accessory will be recognized by the computer or the scanner. An integrated automatic document scanner and active transparency adapter unit would enable the end user to scan flat documents, transparencies and automatic document feed input bundles without making any changes to their scanner configuration or setup.

One possible solution may utilize an accessory type active transparency adapter with a scanner having an automatic document feeder attached to the scanner, if the scanner is not used to control the active transparency adapter. This would be a relatively easy solution, but does not give the image quality required for transparent originals. For best image quality of transparent originals, the scanner should turn off the internal scanner light and utilize the active transparency light when scanning transparent documents. The scanner should also calibrate using the active transparency adapter light, so active transparency adapter accessories without scanner control will necessarily not result in high quality transparent images. Accordingly, an active transparency adapter accessory is not considered to be a very good solution to the problem of trying to use an automatic document feeder scanner to scan transparent documents.

It would be desirable to have an integrated automatic document feeder and active transparency adapter, but does not add significantly to the component count or cost of the scanner, does not add significantly to the manufacturing cost, does not add significantly to the overall height, size or weight of the scanner, does not add moving parts to the scanner that may get out of alignment due to mechanical jarring, and does not significantly increase the complexity of the scanner or the power supply of the scanner.

SUMMARY OF THE INVENTION

The above and other aspects of the present invention are accomplished in a scanner that utilizes an integrated automatic document feeder and active transparency adapter in order to permit a scanner with an automatic document feeder capability to also scan transparent documents with minimal scanner down time and minimal requirements for the end user to reconfigure the scanner and computer between automatic document feed scans and transparent document scans. The solution would utilize a flat panel illuminator in the scanner lid in order to provide back lighting when a transparency is being scanned. The flat panel illuminator active transparency adapter could be mounted under the paper tray or platen area of the automatic document feeder unit. The flat panel illuminator active transparency adapter unit may be controlled using the same control cable used by the automatic document feeder unit. When the integrated automatic document feeder and active transparency adapter unit is installed onto the scanner, the end user can scan using the automatic document feeder mode, the active transparency adapter mode, or the flat platen area of the scanner.

The advantages of the present invention would provide one accessory that provides a complete scanning solution. The scanner would have automatic document feeder and active transparency adapter capabilities at the same time. Also, there would be no need to shutdown, reconnect or reboot the scanner or the computer to change accessories or scanning modes.

BRIEF DESCRIPTION OF THE DRAWINGS

The above and other objects, features and advantages of the present invention will be better understood by reading the following more particular description of the invention, presented in conjunction with the following drawings, wherein.

DETAILED DESCRIPTION OF THE PREFERRED EMBODIMENT

Figure 1:
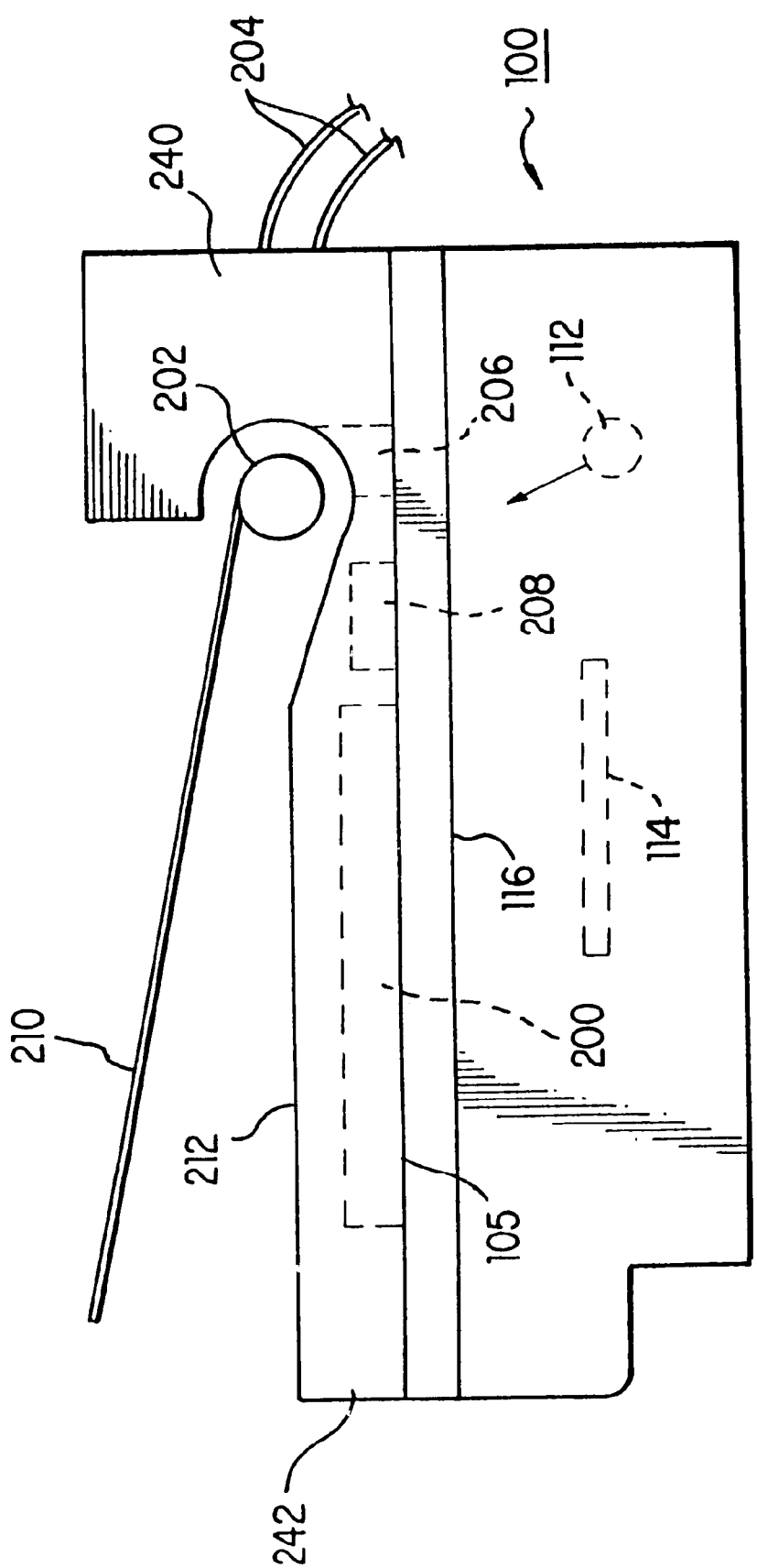
FIG. 1 illustrates a side view of a scanner with an integrated automatic document feeder and active transparency adapter according to the present invention.

FIG. 1 illustrates a side view of a scanner 100 with an integrated automatic document feeder and active transparency adapter 300 in order to provide both automatic document feed capabilities and back lighting for transparent documents (not shown), such as an overhead transparency or photographic negative. The automatic document feeder 240 may have input document tray 210, output document tray 212, feed mechanism 202, control cables 204, automatic document feeder optics 206. The active transparency adapter may have flat panel illuminator 200, and active transparency adapter controller 208. The active transparency adapter may use the control cables 204 for the automatic document feeder 240.

The active transparency adapter 242 may comprise a flat panel screen illuminator 200, such as the type used in laptop computers. Typical flat panel screen illuminators 200 generally have a thickness X of approximately 3 mm. A flat panel illuminator 200 is far more stable than florescent cathode light bulbs as far as illumination and power consumption are concerned. A flat panel illuminator active transparency adapter for a flat bed scanner is disclosed in related patent application U.S. Ser. No. 09/281,600, entitled FLAT PANEL ILLUMINATOR ACTIVE TRANSPARENCY ADAPTER, by Patrick Batten, filed Mar. 30, 1999.

Preferably, the active transparency adapter 242 may be powered and controlled by automatic document feeder cables 204. This would permit the scanner to easily switch between flat bed scanner mode, automatic document feeder mode, and transparent document scanning mode quite readily without the scanner or the computer having to be rebooted or reconfigured by the end user between the various different types of scans. In operation, the end user would merely indicate when a transparency is to be scanned by pushing a button on the scanner, indicating through a graphical user interface on a host computer controlling (not shown) the scanner 108, or otherwise indicate to the scanner controller that a transparent document is to be scanned. Then during the scanning process, the flat panel illuminator 200 will be lit. The light from the flat panel illuminator 200 will pass through the transparent document, through platen 116, through the scanner optics (not shown) and onto a photosensitive transducer 114 within the scanner body 108, which transforms the image into an electronic signal representative of the image on the transparent document.

In a preferred embodiment, when the flat panel illuminator 200 is lit and a scan of a transparent document is being preformed, the light source 112 within the scanner body 108 is not lit. Preferably, surface 105 of flat panel illuminator 200 will be a light diffusing material to provide a reflective surface for scanning other types of documents besides transparencies.

The active transparency adapter 242 may be plugged into the scanner 108 with a cable (not shown) when a transparent document is to be scanned. Under this embodiment, when the active transparency adapter 242 is plugged into the scanner 108, the scanner may provide power to the active transparency adapter 242 and the light source 112 within the scanner 108 may be turned off. Alternatively, the end user may push a button (not shown) on the scanner 108 or use a computer interface to turn on the active transparency adapter 240 and turn off the light source 112 in the scanner body 108.

Another embodiment may permit the scanner to operate in automatic document feeder mode and transparency scanning mode at the same time. This would permit more than one transparent document to be automatically fed into the scanner and scanned without the end user having to open the scanner lid and place each of the transparent documents individually onto the platen 116. For this embodiment, the automatic document feeder 202 may be belt driven or may scan the transparent document one line at a time, similar to the way a facsimile machine scans a document to be transmitted. This would likely be a slower scanning process, but it would permit the end user to scan a stack of transparencies automatically.

Figure 2:
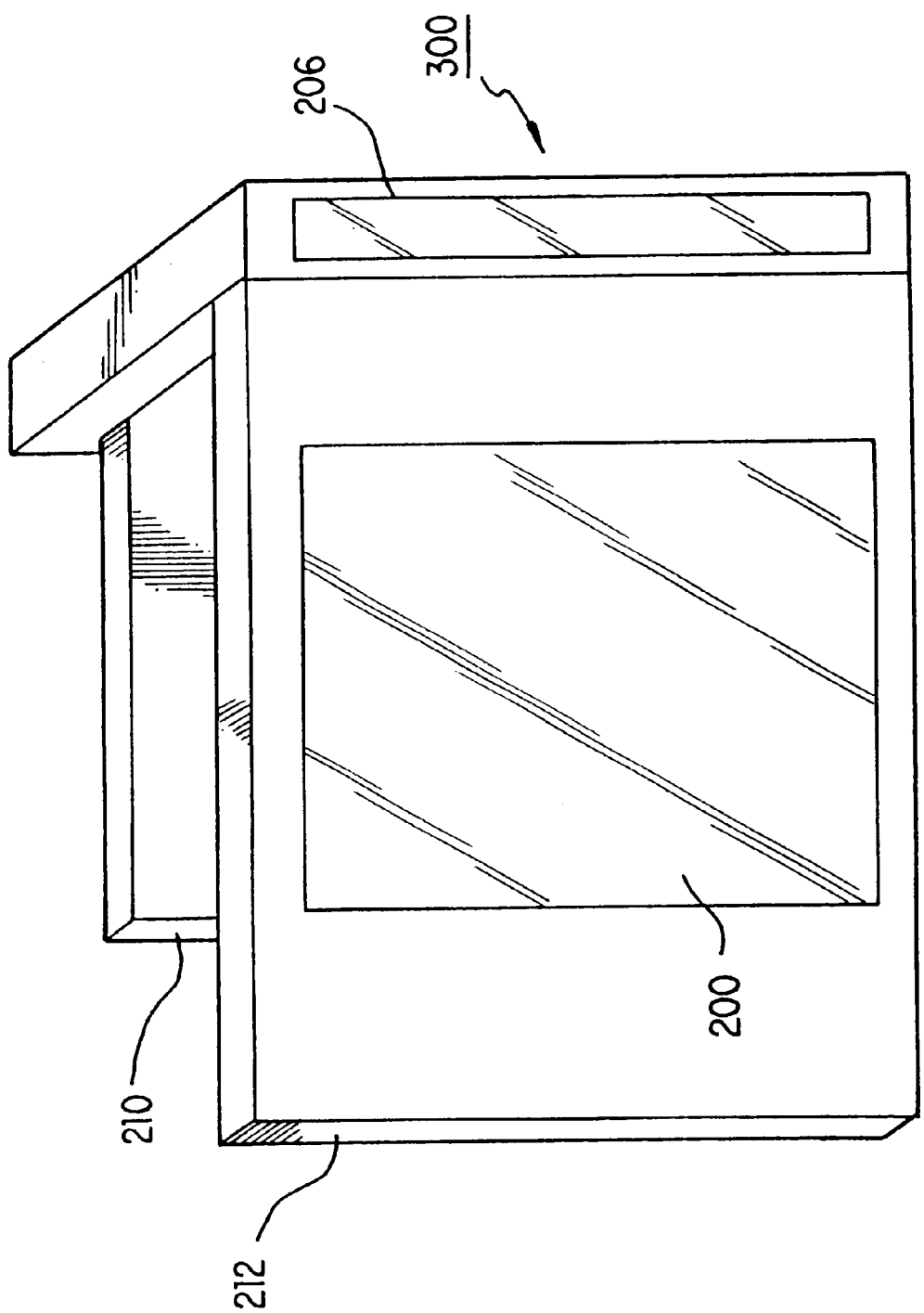
FIG. 2 illustrates a bottom view of the integrated automatic document feeder and active transparency adapter according to the present invention.

FIG. 2 illustrates a bottom view of the integrated automatic document feeder 240 and active transparency adapter 242 of the present invention as shown in FIG. 1. Preferably, the end user may press a button on the scanner 108 or indicate through host computer software that a transparent document is to be scanned, so that the active transparency adapter 242 will be powered and lit and the scanner light source 112 will not be powered and lit during the scan of a transparent document.

The active transparency adapter 242 may have it's own on board power source (not shown) or alternatively be plugged into a power source, such as a typical electric wall outlet via it's own cable (not shown). In this embodiment, the end user may push a button (not shown) on the scanner 108 or use a computer interface to turn on the active transparency adapter 242 and turn off the light source 112 in the scanner 108 or simply leave the internal light source 112 of the scanner on. This embodiment would allow the active transparency adapter 242 and automatic document feeder 240 to be used with any flat bed scanner. Also, as stated earlier the light source 112 of the flat bed scanner 108 may be left on during the scan of a transparent document 106, however, leaving the scanner light source 112 on may decrease the quality of the scan.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A document scanner comprising:
   a scanner base;
   a light source within said scanner base;
   an automatic document feeder having a control cable;
   an image area disposed between the scanner base and the automatic document feeder;
   a flat panel illuminator light source integral with the automatic document feeder, wherein said flat panel illuminator light source directs light through the image area and into the scanner base for processing.

2. The document scanner according to claim 1, wherein only one of said light source within said scanner base or said flat panel illuminator light source within said automatic document feeder may be lit during a scan.

3. The document scanner according to claim 1, wherein said flat panel illuminator is powered and controlled by said control cable to said automatic document feeder.

4. The document scanner according to claim 3, wherein when power is supplied to said flat panel illuminator light source integral with said automatic document feeder, power is not supplied to said light source within said scanner base.

5. The document scanner according to claim 3, wherein said flat panel illuminator and said automatic document feeder may be simultaneously operable to scan more than one transparent document.

6. An adapter for scanning a transparent image using a reflective scanner, the reflective scanner having a platen for receiving a reflective document, the reflective scanner having a light source within the reflective scanner, the adapter comprising:
   an automatic document feeder; and
   a flat panel illuminator attached to said document feeder, wherein light from said flat panel illuminator passes through said transparent image, through said platen and into said reflective scanner for processing during a scan of a transparent image.

7. The adapter for scanning a transparent image using a reflective scanner according to claim 6, wherein when power is supplied to said flat panel illuminator, power is not supplied to said light source within said reflective scanner.

8. A method for manufacturing a scanner comprising the following steps:
   (a) providing a scanner base;
   (b) attaching an automatic document feeder to said scanner base; and
   (c) attaching a flat panel illuminator to said automatic document feeder.

9. A method for scanning a transparent document with a reflective scanner, said reflective scanner having a main body with an internal scanner light source, a photosensitive device, a scanner lid, an automatic document feeder having a flat panel illuminator light source and a platen, said method for scanning a transparent document comprising the following steps:
   (a) putting said transparent document on said platen;
   (b) turning said flat panel illuminator light source on; and
   (c) scanning said transparent document.

10. The method for scanning a transparent document according to claim 9, wherein said internal scanner light source is off during the scanning of said transparent document.

11. The method for scanning a transparent document according the claim 9, wherein said flat panel illuminator light source is integral with said automatic document feeder.

12. The method for scanning a transparent document according to claim 9, wherein said automatic document feeder further comprises control cables and wherein said flat panel illuminator light source is powered and controlled by said control cables of said automatic document feeder.

13. The method for scanning a transparent document according to claim 9, wherein said automatic document feeder and said flat panel illuminator light source are separate from said scanner and have a separate power supply and controller from said scanner.

* * * * *